United States Patent [19]

Flotow et al.

[11] Patent Number: 4,632,235
[45] Date of Patent: Dec. 30, 1986

[54] CLUTCH WITH CANTILEVERED BELLEVILLE SPRING

[75] Inventors: Richard A. Flotow, Butler; Ronald E. Heymann; Martin E. Kummer, both of Auburn, all of Ind.

[73] Assignee: Dana Corporation, Toledo, Ohio

[21] Appl. No.: 759,192

[22] Filed: Jul. 26, 1985

[51] Int. Cl.$^4$ .............................................. F16D 13/44
[52] U.S. Cl. ................................. 192/70.27; 192/89 B
[58] Field of Search ........................... 192/89 B, 70.27

[56] References Cited

U.S. PATENT DOCUMENTS

| | | | |
|---|---|---|---|
| 2,047,737 | 7/1936 | Lane | 192/89 B X |
| 2,073,146 | 3/1937 | Gardiner | 192/70.27 |
| 2,232,848 | 2/1941 | Geyer | 192/70.27 |
| 3,385,409 | 5/1968 | Smirl | 192/70.11 |
| 3,392,812 | 7/1968 | Kaptur et al. | 192/99 S |
| 3,561,577 | 2/1971 | Binder | 192/70.28 X |
| 3,583,537 | 6/1971 | Spannagel | 192/70.13 |
| 3,791,502 | 2/1974 | Nakane | 192/111 A |
| 3,834,501 | 9/1974 | Adachi | 192/70.28 |
| 4,214,653 | 7/1980 | Slack | 192/48.7 |
| 4,291,792 | 9/1981 | Henao | 192/89 B |
| 4,410,074 | 10/1983 | Maucher et al. | 192/48.7 |
| 4,420,070 | 12/1983 | Maucher et al. | 192/48.8 |
| 4,425,991 | 1/1984 | Hays | 192/70.27 |
| 4,427,101 | 1/1984 | Maucher et al. | 192/48.7 |

FOREIGN PATENT DOCUMENTS

| | | | |
|---|---|---|---|
| 2075618 | 11/1981 | United Kingdom | 192/89 B |
| 626273 | 9/1978 | U.S.S.R. | 192/89 B |
| 709867 | 1/1980 | U.S.S.R. | 192/89 B |
| 773332 | 10/1980 | U.S.S.R. | 192/89 B |

Primary Examiner—Rodney H. Bonck
Attorney, Agent, or Firm—Frank B. McDonald

[57] ABSTRACT

A friction disc clutch includes a radially extending Belleville diaphragm spring having its outer peripheral portion rigidly secured to a flywheel. In one preferred form, the diaphragm spring reacts against a fulcrum on the rear side of a pressure plate to effect engagement and release of a pull type friction clutch. A mounting portion integrally joined with the radially extending Belleville diaphragm spring, includes an annular rim for affixation to the flywheel. The result is a "cantilevered" Belleville spring action, wherein the forces obtainable are greater than those normally achieved by a Belleville having its outer portion unconstrained and hence free for axial deflection.

3 Claims, 4 Drawing Figures 4,632,235

CLUTCH WITH CANTILEVERED BELLEVILLE SPRING

BACKGROUND OF THE INVENTION

This invention relates generally to friction disc clutches of the type which incorporate Belleville springs for clutch engagement. More particularly the invention relates to improvements in achieving greater spring forces as a function inverse to clutch size.

Prior art Belleville and other diaphragm spring clutches are made in numerous designs and styles. Most of such clutches, however, are of a complex nature; particularly as to the manner in which the outer portion of the diaphragm spring interacts with the clutch cover. For example, a typical system includes a diaphragm spring which is fulcrumed on either loose rivets or wire rings, which in turn are supported by a clutch cover. A plurality of connecting members, designed to permit the outer periphery of the diaphragm spring to slide or shift back and forth relative to the cover, are circumferentially spaced about the cover to form a connection system between the cover and diaphragm spring.

Such clutch designs are not of the most efficient or necessarily desirable clutch construction, particularly to the extent that for given Belleville spring thicknesses, the diameters of such clutches are unnecessarily large. Thus smaller more efficient and hence more effective clutch packages could be utilized to produce the same results.

SUMMARY OF THE INVENTION

The invention disclosed herein provides a friction disc clutch which incorporates a cantilevered Belleville diaphram spring mounted rigidly with respect to the clutch flywheel and subject only to bending deflection relative thereto. In a preferred form, an axially disposed mounting portion includes an annular rim for affixation directly to the flywheel. The Belleville diaphragm spring is a radially extending portion of the same structure, and is integrally joined to the axially extending mounting portion. The result is a modification of the characteristic force-deflection curve of a traditional Belleville spring. For a given diameter, a greater force per unit deflection is applied against a pressure plate than if the outer periphery of the Belleville remains unconstrained, as in conventional Belleville clutch systems. As a result, the diameter of the overall clutch package and/or the Belleville cover thicknesses may be reduced without compromise in load capacity. An additional benefit is that the clutch has fewer separate parts and is hence less expensive to manufacture.

DETAILED DESCRIPTION OF A PREFERRED EMBODIMENT

Figure 1:
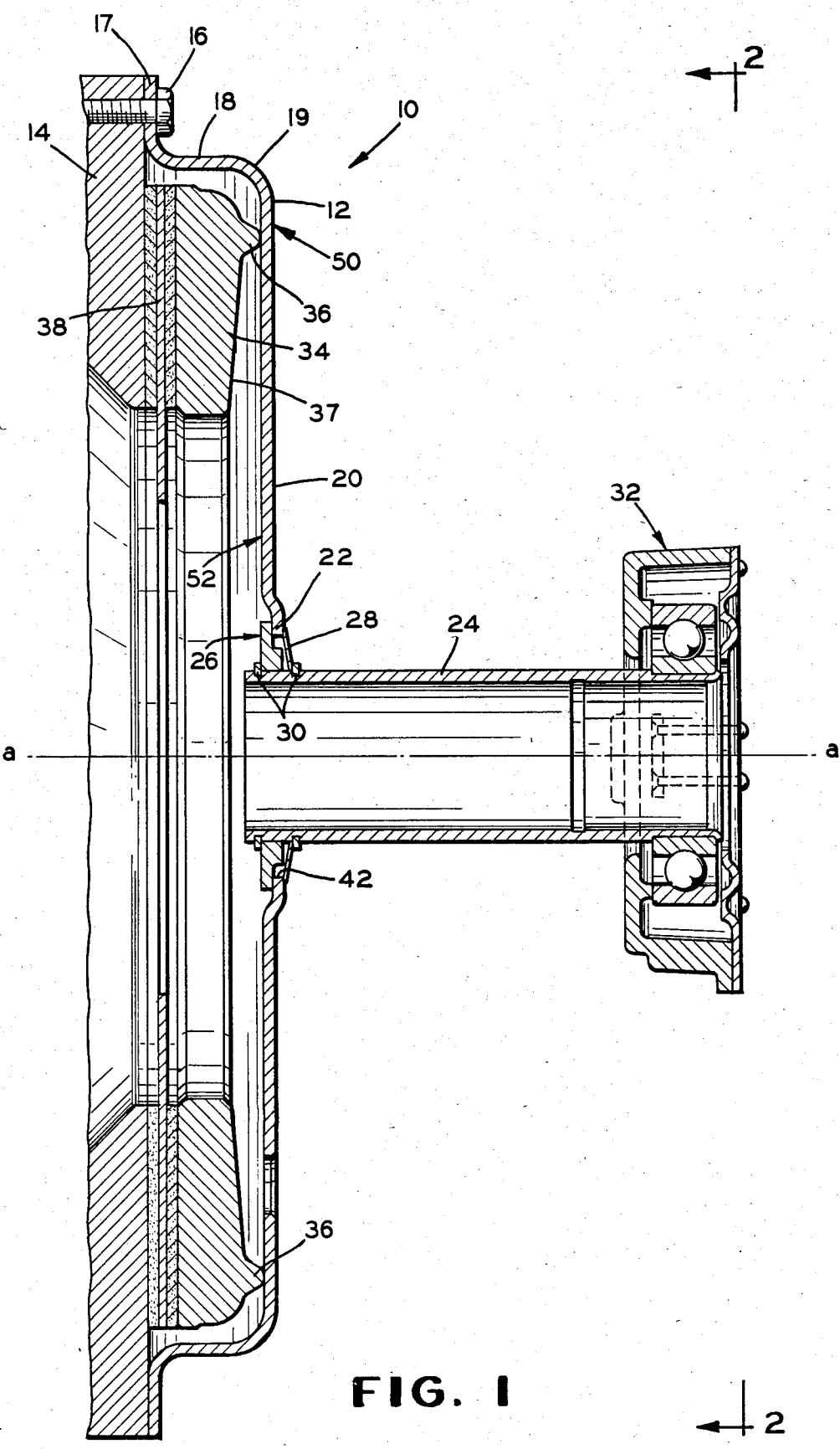
FIG. 1 is a cross-sectional view of a "pull type" clutch constructed in accordance with the present invention, which includes a preferred embodiment of a cantilevered Belleville diaphragm spring.

Referring initially to FIG. 1, a preferred embodiment of a friction clutch 10 is shown generally in cross-section. The clutch 10 includes a spring fixture 12 rigidly secured to a flywheel 14 and rotatable with the flywheel about an input shaft axis "a—a". The spring fixture 12 is secured to the flywheel 14 by a plurality of bolts 16 positioned circumferentially about an outer peripheral edge or annular rim 17 of a mounting portion 18 on the fixture 12. Formed preferably of a spring steel material, the fixture 12 includes the axially extending mounting portion 18 and a radially extending Belleville diaphragm spring portion 20 integrally joined thereto at a junction defining an elbow 19 as shown. The two portions 18 and 20 are approximately at right angles with respect to one another in the clutch-engaged position of the fixture 12 depicted in FIG. 1.

In the preferred embodiment shown, and by way of example only, the radially extending Belleville diaphragm spring portion 20 includes an axially offset inner peripheral edge 22. The edge 22 is secured to a release bearing sleeve 24 by means of a bracket 26 and cone washer 28. A pair of snap rings 30 are utilized to axially fix the bracket and cone washer parts on the sleeve 24.

A manually actuated release bearing assembly 32 is axially cycled for clutch engagement and release. The assembly 32 is rigidly coupled to the sleeve 24, which as noted engages the inner peripheral edge 22. As the clutch 10 of FIG. 1 requires that the release assembly 32 pull the inner edge 22 away from a pressure plate 34 for clutch disengagement, the clutch 10 is referred to as a "pull type" clutch. The Belleville diaphragm spring portion 20 is sprung so as to hold the clutch 10 in a normally engaged position, and the release assembly 32 is thus utilized to counteract or overcome the clutch engaging spring force of the Belleville to effect clutch release.

Figure 2:
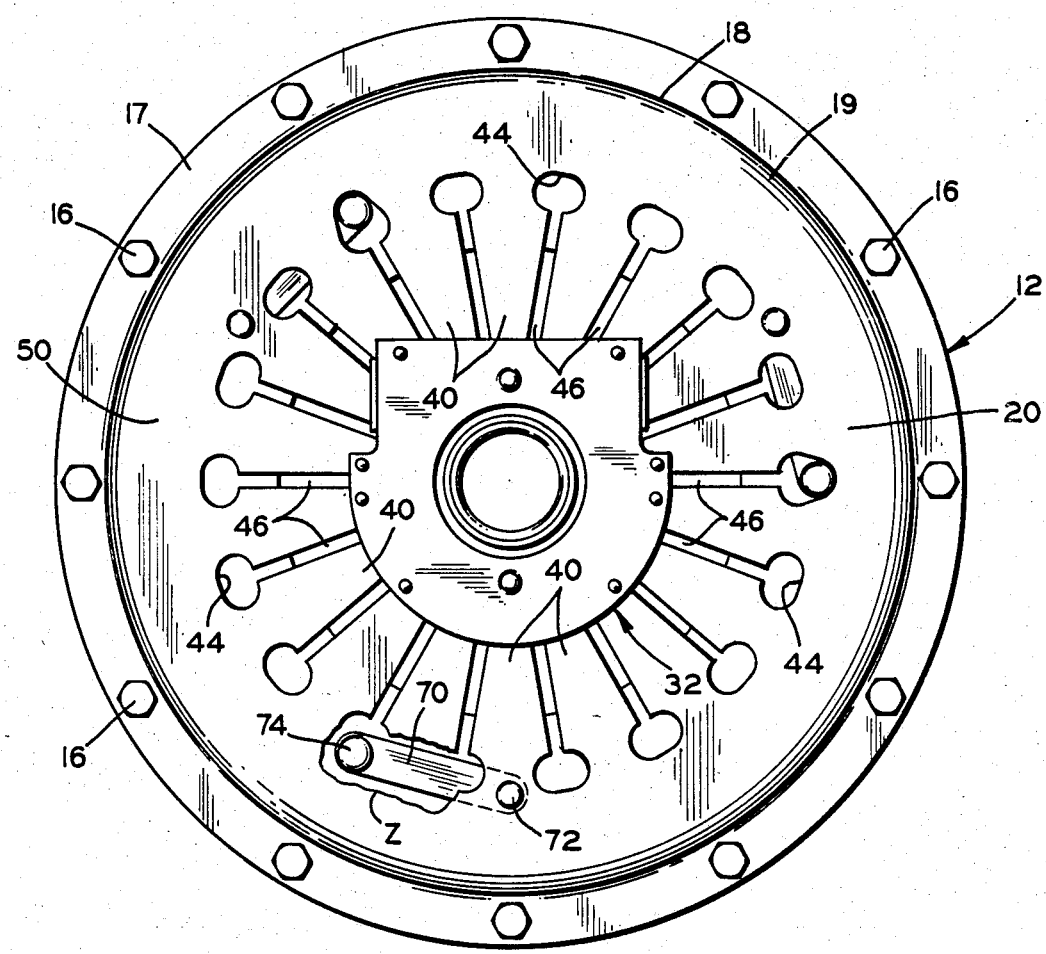
FIG. 2 is a plan view, partly in section, of the diaphragm spring portion shown in FIG. 1, taken along lines 2—2 thereof.

The rear surface 37 of the pressure plate 34 includes a fulcrum boss 36 which is preferably an integral annular ring positioned symmetrically about the plate 34. Referring momentarily to FIG. 2, the cutaway "Z" reveals a flexible drive strap 70 by which the pressure plate 34 and spring portion 20 are coupled together by fasteners 72 and 74.

When the actuating forces on the release assembly 32 are removed, the Belleville forces are free to hold the clutch in the normally engaged position of FIG. 1. The boss receives a normal force load imposed by the radially extending diaphragm spring portion 20, and clutch engagement is effected via compression by the spring portion 20 of a driven disc 38 between the flywheel 14 and the pressure plate 34.

Upon clutch release, rightward movement of the release bearing 32 will cause the inner peripheral edge 22 of the radially extending diaphragm spring portion 20 to move rightwardly, thus springing the radially extending portion 20 out of the clutch engagement position of FIG. 1. This action will release the clamping forces sufficient to hold the driven disc 38 against the flywheel 14.

A major distinguishing feature of the present invention over the diaphragm clutches of the prior art is that the outer peripheral portion 50 of the Belleville diaphragm spring 20 of the present clutch is rigidly fixed with respect to the flywheel 14. In the presently preferred embodiment, the diaphragm spring portion 20 is integrally cantilevered from the mounting portion 18, and hence the effective outer portion 50 of the Belleville spring 20 is constrained with respect to the flywheel so that it is free to deflect with respect thereto only in a bending mode. Existing clutch Belleville springs, on the other hand, do not have fully constrained outer peripheries, and are subject to conventional shifting and sliding components of deflection relative to the cover/flywheel whenever the Belleville is flexed between clutch engagement and disengagement. The rigid affixation of the outer portion of the presently preferred Belleville spring system gives rise to a "cantilevered beam loading" phenomenon wherein movement of the release bearing assembly 32 will be effective to create only a bending deflection of the Belleville. Thus, leftward and rightward movement of the release assembly 32 will cause no sliding or shifting of the Belleville, and indeed there will occur no deflection of the Belleville apart from the bending deflection. The latter deflection approaches that of a beam fully constrained at one end and loaded at an opposite free end.

One major benefit is that a greater force to deflection ratio is realized over that achieved solely by means of a conventional Belleville spring system, thus permitting the successful use of a smaller clutch package diameter. At the same time, however, there is no loss in effectiveness over that of a conventional Belleville clutch system having its outer periphery unconstrained.

Referring now to both FIGS. 1 and 2, the radially extending Belleville diaphragm spring portion 20 of the spring fixture 12 includes a plurality of spring fingers 40 extending radially inwardly. The spring fingers 40 contain innermost extremities 42 which define the aforenoted inner peripheral edges 22 (FIG. 1). A plurality of symmetrically spaced stress relief apertures 44 (FIG. 2) are interdigitally positioned with respect to the fingers 40, and the apertures 44 define the terminations of a like number of symmetrical gaps 46, the latter of which define the spacing between the individual fingers 40.

Thus, it will be appreciated by those skilled in the art that the diaphragm spring portion 20 of the fixture 12 (FIG. 1) is of a "modified" Belleville construction, to the extent that the outer portion or peripheral edge 50 is constrained, and hence is not free for the translational shifting and sliding deflections experienced by conventional Belleville spring systems.

Figure 3:
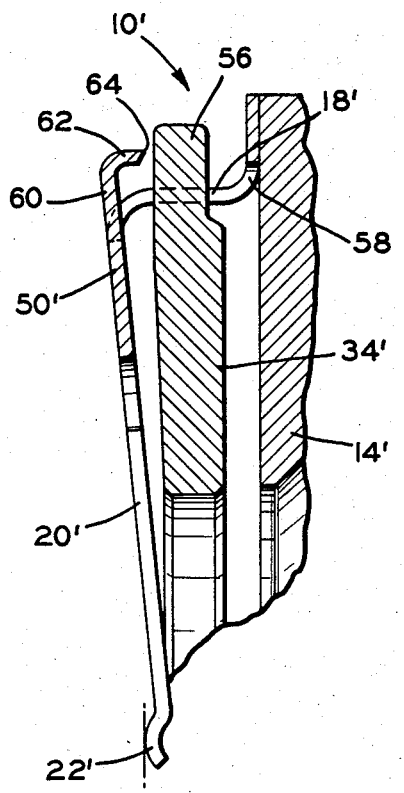
FIG. 3 is a fragmentary cross-sectional view of a "push type" clutch constructed in accordance with the present invention, which includes an alternate preferred embodiment of a cantilevered Belleville spring.
Figure 4:
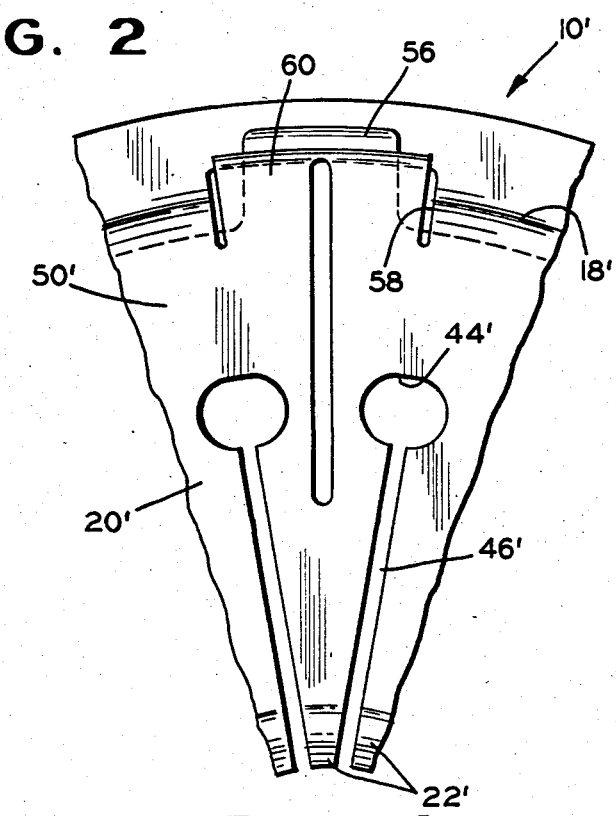
FIG. 4 is a fragmentary plan view of the diaphragm spring portion and pressure plate engaging mechanism of the clutch embodiment of FIG. 3.

As noted earlier, the clutch 10 represented in FIGS. 1 and 2 is of the "pull type" of clutch wherein the inner edge 22 of the Bellevile diaphragm spring portion 20 is literally pulled away from the pressure plate 34 to effect clutch release. The invention presented herewith is also suitable for utilization in clutches of the "push type", wherein the inner edge of the Belleville is pushed toward the pressure plate for effecting clutch release. Thus, referring to FIGS. 3 and 4, fragmentary views of a modification of the clutch 10 are shown in a clutch system designated as 10'.

In the clutch 10', a cantilevered Belleville 20' includes a plurality of pressure plate contact lugs 60 circumferentially spaced, and positioned radially outwardly of the mounting portion 18'. In the presently preferred embodiment, three or four of such lugs are effective to provide for satisfactory operation. The lugs 60 all lie in the same plane as the cantilevered Belleville 20', and hence move with the Belleville when deflected by operation of a release assembly (not shown) in engagement with the extremity 22'.

For this purpose, the pressure plate 34' includes a like plurality of contact extension portions 56 which protrude radially through slots 58 in the mounting portion 18'. Each lug 60 contains an axially extending portion 62 disposed for engaging the contact extension portions 56. In the presently preferred embodiment, the portions 62 present knife edge contacts 64, which afford an optimal engagement and disengagement relationship with the pressure plate contact extension portions 56.

Although the clutches 10 and 10' have Belleville diaphragm spring portions which are sprung so as to hold the respective clutches in normally engaged positions, the spring portion 20 of clutch 10 is sprung so that its extremity 22 is normally loaded toward the pressure plate 34, while the diaphragm spring portion 20' of the clutch 10' is sprung so that its extremity 22' is normally loaded away from the pressure plate 34'. In all other respects, the "push type" system clutch 10' is analagous to the apparatus presented in the pull type clutch 10 of FIGS. 1 and 2, particularly with respect to the operation of the cantilevered Belleville diaphragm spring portion.

Although only two presently preferred embodiments have been shown and described herein, numerous other embodiments are envisioned to fall within the spirit and scope of the following claims.

What is claimed is:

1. In a push-type friction disc clutch assembly including a flywheel, a pressure plate, a driven disc positioned intermediately of said flywheel and said pressure plate and adapted for selective frictional engagement of said flywheel, a radially extending Belleville diaphragm spring having outer and inner peripheral portions, said clutch further including a release bearing in constant engagement with said inner peripheral portion; an improvement characterized by said clutch further comprising a mounting portion integrally joined to said diaphragm spring at said outer peripheral portion, said mounting portion rigidly secured to said flywheel, said mounting portion comprising an axially extending portion affixed to said outer peripheral portion, whereby said Belleville diaphragm spring is contilevered from said mounting portion, and subjected only to bending deflectin to effect clutch engagement and release upon axial movement of said release bearing, wherein said clutch further comprises a plurality circumferentially spaced slots in said mounting portion, a plurality of pressure plate contact extension portions extending radially through said slots, and a plurality of pressure plate contact lugs extending radially outwardly of said diaphragm spring for selective engagement and disengagement of said extension portions by said axial movement of said release bearing.

2. The friction clutch of claim 1 wherein said pressure plate contact lugs comprise axially extending portions thereon disposed for direct contact with said contact extension portions of said pressure plate.

3. The friction clutch of claim 2 wherein said axially extending portions of said lugs comprise knife edge contacts.

* * * * *